United States Patent

Merger

[15] 3,686,304
[45] Aug. 22, 1972

[54] PRODUCTION OF ACRYLIC UREIDES

[72] Inventor: Franz Merger, Ludwigshafen, Germany

[73] Assignee: Badische Anilin - & Soda-Fabrik Aktiengesellschaft, Ludwigshafen/Rhine, Rhineland-Pfalz, Germany

[22] Filed: Dec. 27, 1968

[21] Appl. No.: 787,583

[30] Foreign Application Priority Data

Dec. 27, 1967 Germany..........P 16 43 723.3

[52] U.S. Cl...............260/553 E, 260/999, 71/119, 260/553 R, 260/615.5, 260/45.9 P
[51] Int. Cl...........................................C07c 127/14
[58] Field of Search..................260/553 E

[56] References Cited

UNITED STATES PATENTS

| | | |
|---|---|---|
| 3,129,246 | 4/1964 | Harris et al...............260/553 |
| 3,282,998 | 11/1966 | Adams et al..............260/553 |
| 2,090,594 | 8/1937 | Jacobson..................260/553 |

OTHER PUBLICATIONS

Merger, Chem. Ber. Vol. 101, pp. 2,419- 2,425, No. 7 (1968)

*Primary Examiner*—Leon Zitver
*Assistant Examiner*—Michael W. Glynn
*Attorney*—Johnston, Root, O'Keeffe, Keil, Thompson & Shurtleff

[57] ABSTRACT

The production of acrylic ureides by the reaction of urea with acrylyl chloride, and the new acrylic ureide. The new product of the process is a pesticide and a valuable intermediate for the production of synthetic resins, textile auxiliaries, pesticides, stabilizers and baking finishes.

9 Claims, No Drawings

PRODUCTION OF ACRYLIC UREIDES

The invention relates to the production of acrylic ureides by reaction of urea with acrylyl chlorides, and a new substance of this type.

It is known from German Pat. specification No. 851,339 that polymeric bis-acrylic ureide is obtained by reaction of acetylene, urea and nickel carbonyl. The production of acrylic ureide has not hitherto been described; reaction of urea with acrylic acid results in hexahydropyrimidine-dione-(2,4) (Journal of Organic Chemistry, vol. 26 (1961), pp. 1,877 to 1,884). Reaction of urea with acrylyl chloride and dimethyl formamide at from 0° to 25° C results in reaction products of urea with dimethyl formamide (Zeitschrift fur Chemie, vol. 6 (1966), p. 315). Methacrylic ureide can be obtained in yields of from 38 to 43.7 percent from monosodium urea and methyl methacrylate according to Journal of the American Chemical Society, vol. 67 (1945), pp. 1,998 to 1,999. A process for the production from methacrylic chloride has not hitherto been known.

The object of the present invention is a new process for the production of acrylic ureides in good yields and purity in a simple manner.

Another object of the invention is a new acrylic ureide.

These and other objects of the invention are achieved and acrylic acid ureides having the general formula:

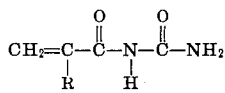

in which R denotes a hydrogen atom or the methyl radical are obtained advantageously by placing urea with acrylyl chloride or methacrylyl chloride in a vessel and then reacting them in the presence of a base and an organic solvent which is inert under reaction conditions at a temperature of from 40° to 150° C.

When acrylyl chloride is used the reaction may be represented by the following equation:

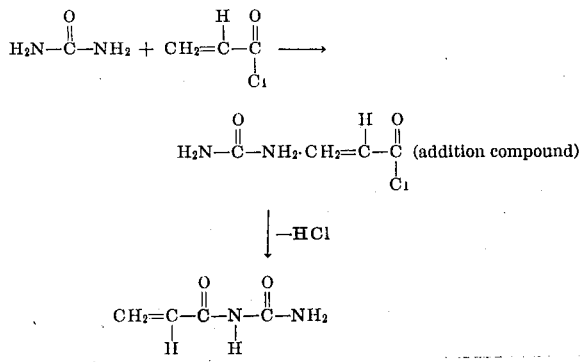

The process according to the invention gives the hitherto unknown acrylic ureide and methacrylic ureide in good yields and purity by a simple method.

The starting materials urea and acrylyl chloride or methacrylyl chloride react with each other in an exothermic reaction, probably with the formation of an adduct which has not yet been described, the said adduct changing into the corresponding acrylic ureide while splitting off hydrogen chloride under the conditions of the process. The starting materials are preferably used in stoichiometric amounts but acrylyl or methacrylyl chloride may be used in excess or in a molar ratio of up to 2 moles of chloride to 1 mole of urea. The adduct may be isolated and the reaction carried out with the isolated adduct as starting material.

The bases used in the process bind the hydrogen chloride formed and accelerate the reaction. The bases used are inorganic or organic bases having basicity constants of $K_B$ more than $10^{-10}$. They are generally used in an amount of from 100 to 200 mole percent with reference to acrylyl or methacrylyl chloride. Thus for example the following bases may be used: hydroxides of sodium, potassium, calcium, barium, strontium; alkali metal alcoholates and carbonates, for example sodium carbonate, sodium methylate; tertiary amines, for example triethylamine, pyridine, dimethylaniline and diisopropylmethylamine.

The reaction is carried out continuously or batchwise at a temperature of from 40° to 150° C, preferably from 40° to 90° C, at atmospheric or superatmospheric pressure. It is advantageous to place the adduct of urea and acrylyl chloride or methacrylyl chloride in a vessel at a temperature of from 0° to 80° C, preferably from 25° to 40° C, and then to cause reaction by adding the base, if necessary after heating up to the abovementioned reaction temperature, to form the acrylyl ureide or methacrylyl ureide.

Reaction is carried out in the presence of organic solvents which are inert under the reaction conditions, such as cyclic ethers, for example dioxane, tetrahydrofuran; chlorohydrocarbons, for example chloroform and methylene chloride; carboxylic esters, for example acetate; nitriles, for example acetonitrile. The solvent is generally used in an amount of from 100 to 1,000 percent by weight with reference to acrylyl or methacrylyl chloride, preferably 250 to 750 percent by weight with reference to the acrylyl chloride or methacrylyl chloride. Amides, for example dimethyl formamide, cannot be used as solvents.

The reaction may be carried out as follows: acrylyl chloride or methacrylyl chloride is added to a mixture of urea and solvent during from 5 minutes to 2 hours and the addition compound is prepared at a temperature of from 0° to 80° C, if necessary while cooling. The adduct may then be separated by filtering the mixture, solvent is again added and conversion into acrylic ureide or methacrylic ureide is carried out after the addition of the base. Advantageously however, without separating the adduct, the reaction mixture may be brought to the reaction temperature and the base may be added with good mixing, the reaction temperature being kept at the proper level if necessary by cooling. The reaction is over after about 30 minutes to 5 hours. The mixture is filtered (the salt formed from hydrogen chloride and the base being separated as filter cake) and the filtrate is concentrated. The filter residue contains the acrylic or methacrylic ureide, which may be purified if necessary by washing with water or by recrystallization from water.

The new and the known compounds which can be prepared by the process according to this invention are pesticides and valuable intermediates for the production of synthetic resins, textile auxiliaries stabilizers, baking finishes and pesticides. Thus for example acrylic ureide, in concentration as low as 50 ppm, exhibits very good action against Aspergillus and Barley mildew and good action against grape peronospora (in a spray concentration of 0.12 percent).

In the reaction of acrylic ureide with ammonia and amines, the β-aminopropionic ureides are obtained which are stabilizers for polyformaldehyde.

The invention is illustrated by the following examples. The parts specified in the examples are parts by weight.

EXAMPLE 1 a. Production of the adduct:

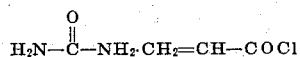

200 parts of acrylyl chloride is added in the course of 30 minutes to a suspension of 120 parts of urea in 600 parts dioxane while stirring, the temperature being held at from about 25° to 35° C by cooling with ice. The reaction is carried out until the temperature of the reaction mixture does not rise any more (1 hour), and the crystals formed are filtered off. 294 parts of the complex of urea and acrylyl chloride is obtained. It has a melting point of 73° C.
Analysis:
calculated: C 31.92% H 4.69% O 21.25% N 18.59% Cl 23.55%
found: C 31.8% H 4.9% O 21.5% N 18.9% Cl 23.0% b. Dehydrochlorination:

300 parts of the complex of urea and acrylyl chloride in 750 parts of dioxane is rapidly heated to 60° to 70° C with vigorous stirring and reacted for 20 minutes in the presence of 300 parts of triethylamine, the heat of reaction being withdrawn by a cooling bath to maintain a temperature range of from 65° to 75° C. The mixture is stirred for another 30 minutes, filtered and the filtrate is concentrated in a water-jet vacuum. 122 parts of acrylic ureide (equivalent to 53.5 percent of the theory) is obtained having a melting point of from 156° to 158° C. Acrylic ureide crystallizes from water in colorless needles having a melting point of from 162° to 164° C.
Analysis:
calculated: C 41.1% H 5.3% N 24.55% O 28.05%
found: C 42.1% H 5.4% N 24.4% O 28.2%.

EXAMPLE 2

180 parts of urea and 300 parts of acrylyl chloride in 1,000 parts of dioxane are treated in the way described in example 1 until the evolution of heat has ceased. The reaction mixture is rapidly heated to 60° C and dehydrochlorinated at 60° to 70° C with 400 parts of triethylamine while stirring vigorously. The mixture is filtered and the filtrate concentrated. 167.5 parts of acrylic ureide (equivalent to 49 percent of the theory with reference to urea used) is obtained as a pale yellow crystallized product. A colorless end product having a melting point of from 162° to 164° C is obtained by recrystallization from water.

EXAMPLE 3

120 parts of urea and 200 parts of acrylyl chloride in 750 parts of dioxane are treated as described in example 1 until the evolution of heat has ceased. The reaction mixture is allowed to react for 1 hour at 70° C with 300 parts of finely powdered anhydrous sodium carbonate with vigorous stirring and the mixture is aftertreated for 4 hours. 77.6 parts of acrylic ureide (equivalent to 34 percent of the theory with reference to urea used) is obtained by filtering the mixture and concentrating the filtrate.

EXAMPLE 4

120 parts of urea and 200 parts of acrylyl chloride in 750 parts of dioxane are treated in the way described in example 1 until there is no further evolution of heat. The reaction mixture is allowed to react with vigorous stirring for one hour in the presence of 220 parts of calcium hydroxide and the mixture is aftertreated for 4 hours. 61.7 parts of acrylic ureide (equivalent to 27 percent of the theory with reference to urea used) is obtained by filtration and concentration of the filtrate.

EXAMPLE 5

210 parts of methacrylyl chloride is added in the course of 40 minutes to a suspension of 120 parts of urea in 700 parts of dioxane, the temperature being kept at from 30° to 35° C by cooling with ice. Reaction is continued until no further heat of reaction is liberated (1 hour), the mixture then being rapidly heated to from 60° to 70° C. 250 parts of triethylamine is added and the mixture is reacted after 20 minutes while cooling at from 65° to 75° C. The mixture is then stirred for another 30 minutes, filtered and the filtrate is concentrated in a water-jet vacuum. 121 parts (equivalent to 47 percent of the theory) of methacrylic ureide is obtained. It forms colorless crystals having a melting point of from 128° to 130° C from ethanol.
Analysis:
calculated: C 46.8% H 6.29% O 24.98% N 21.85%
found: C 46.81% H 6.2% O 25.1% N 22.0%.

I claim:

1. Acrylic ureide having the formula:

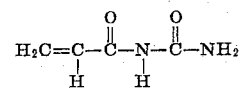

2. A process for the production of acrylic ureides having the formula:

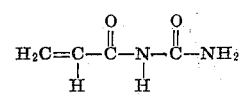

in which R denotes a hydrogen atom or the methyl radical, which comprises (a) reacting urea and acrylyl chloride or methacrylyl chloride in an organic solvent which is inert under the reaction conditions to form an adduct and (b) converting said adduct into the corresponding ureide by reacting it with a base at a temperature of from 40° to 150°C in an organic solvent which is inert under the reaction conditions, said base having a basicity constant of $K_B$ more than $10^{-10}$.

3. A process as claimed in claim 2 wherein the base is a compound selected from the group consisting of hydroxides of sodium, potassium, calcium, barium, and strontium, sodium carbonate, sodium methylate, triethylamine, pyridine, dimethylaniline and diisopropylamine.

4. A process as claimed in claim 2 wherein said urea and said acrylyl chloride or said methacrylyl chloride are used in stoichiometric amounts.

5. A process as claimed in claim 2 wherein the molar ratio of acrylyl chloride or methacrylyl chloride to urea is 1–2:1.

6. A process as claimed in claim 3 wherein the amount of said base is in the range of 100 to 200 mol percent with reference to said acrylyl chloride or said methacrylyl chloride.

7. A process as claimed in claim 2 wherein said reaction temperature is in the range of 40° to 90°C.

8. A process as claimed in claim 2 wherein said organic solvent in step (a) is used in an amount of 100 to 1,000 percent by weight with reference to said acrylyl chloride or methacrylyl chloride.

9. A process as claimed in claim 2 wherein said organic solvent in step (a) is used in an amount of 250 to 750 percent by weight with reference to said acrylyl chloride or methacrylyl chloride.

* * * * *